United States Patent [19]
Vedel

[11] Patent Number: 5,974,308
[45] Date of Patent: Oct. 26, 1999

[54] SELECTIVE BROADCASTING OF CHARGE RATES

[75] Inventor: Andreas Peter Braëm Vedel, Sollentuna, Sweden

[73] Assignee: Telefonaktiebolaget LM Ericsson, Stockholm, Sweden

[21] Appl. No.: 08/747,838

[22] Filed: Nov. 13, 1996

[51] Int. Cl.⁶ .................................................. H04Q 7/22
[52] U.S. Cl. ........................................ 455/407; 379/130
[58] Field of Search ...................... 455/406, 407, 455/453; 379/112, 114, 130, 132

[56] References Cited

U.S. PATENT DOCUMENTS

| | | | |
|---|---|---|---|
| 4,358,844 | 11/1982 | Pirani | 370/342 |
| 4,365,327 | 12/1982 | Pirani | 370/342 |
| 4,640,986 | 2/1987 | Yotsutani et al. | 455/407 |
| 4,979,207 | 12/1990 | Baum et al. | 379/112 |
| 5,109,401 | 4/1992 | Hattori et al. | 455/407 |
| 5,134,651 | 7/1992 | Ortiz et al. | 379/112 |
| 5,218,618 | 6/1993 | Sagey | 375/200 |
| 5,303,297 | 4/1994 | Hillis | 455/406 |
| 5,517,549 | 5/1996 | Lee | 455/407 |
| 5,523,939 | 6/1996 | Psinakis et al. | 363/59 |
| 5,794,140 | 8/1998 | Sawyer | 455/406 |

FOREIGN PATENT DOCUMENTS

| | | |
|---|---|---|
| 0 647 055 | 4/1995 | European Pat. Off. . |
| 0 656 733 | 6/1995 | European Pat. Off. . |
| WO 96/20570 | 7/1996 | WIPO . |
| WO 97/37503 | 10/1997 | WIPO . |

*Primary Examiner*—Willis R. Wolfe
*Attorney, Agent, or Firm*—Burns, Doane, Swecker & Mathis, L.L.P.

[57] ABSTRACT

A cellular phone system, optimizing user demand by charging system subscribers according to a Variable Charge Rate (VCR) that is based on the price elasticity of the subscribers. According to the present invention, the service provider monitors the load in each cell and, for each cell, the service provider continuously determines a charge rate that can be tailored to specific subscriber category according to a number of variables, offering subscribers a VCR that is optimized for the individual cell's capacity and overall system capacity. According to an exemplary embodiment, subscribers may use mobile stations supporting the Short Message Service (SMS) to provide the subscribers with the broadcast VCR. The system can determine, in real time, optimal VCRs for individual cells to maximize revenue generated by the cell for any time of day. The VCRs may be selectively broadcast to the VCR-mobile station to inform subscribers of the current rate of charge for calls. VCRs may be tailored to specific categories of subscribers to provide better price differentiation between subscribers based on price elasticity of the subscribers categories.

30 Claims, 4 Drawing Sheets

SELECTIVE BROADCASTING OF CHARGE RATES

BACKGROUND

The present invention relates to cellular telephone systems and, in particular, to a method and apparatus for controlling and optimizing the utilization of cellar telephone systems.

A cellular telephone system normally services an area populated by a number of users. Looking at FIG. 1, the service area of the system typically is divided up into cells (C1–C10), each equipped with a base station (BS1-BS10) capable of communicating with a number of users (M1-10) within the cell. Inherently, each cell has a maximum number of users that can be handled simultaneously. This is referred to as the cell's capacity. In addition, the service area containing the cells has an overall capacity. A critical factor which is taken into account in providing cellular telephone service to subscribers is the overall capacity of the system.

A basic problem with designing any cellular system is how much overall and individual cell capacity should be provided to ensure adequate service while maximizing revenues generated from the users of the cellular system. Complicating the design of such a system is the fact that the number of calls, or demand for use of the system, varies dramatically in each cell according to the time of day. On one hand, insufficient capacity during peak hours of system operation will cause congestion, and the inability to provide adequate service to users. On the other hand, providing too much unused capacity during off-hours under utilizes resources that increases overall cost of system operation. Therefore, it is important to optimize the trade-off between adequate capacity to handle anticipated subscriber demand for the system during peak usage while minimizing the unused capacity during off-hours. The more difficult of these two is how to maximize system usage during the hours when the system's capacity is largely idle.

Various methods and systems have been devised in order to maximize usage of the overall capacity of a cellular system at every time of day. In the past this has been attempted by varying the rate charged to subscribers of the system and its services at different times. For example, during peak hours, such as business hours when demand is at its greatest, all subscribers pay a full rate. However, as subscriber demand decreases, for example, during the evening and weekend hours, rates are reduced in one or more steps in order to encourage increased utilization of the system.

Varying the price is an effective means for regulating system demand because of the price sensitivity of subscribers. Certain subscribers are more price sensitive than others. This is known as a subscriber's price elasticity. For example, a personal use subscriber's price elasticity is much greater than a business use subscriber because, unlike a business use subscriber, a personal use subscriber's need to make a call is usually much less urgent or necessary. As a result, personal use subscribers may delay or make fewer calls for no other reason than the price of the call or because it comes out of their own pocket. Accordingly, personal use subscribers are more likely to be induced to use a system when rates are lower.

Cellular service providers often charge higher rates during the week, especially during working hours, for cellular calls. Because of these higher rates, certain subscribers who would otherwise use the cellular phone system are discouraged from making calls due to the higher rates. During peak hours, when the system is being used to near capacity, this is not a problem for the service provider because maximum revenue is being generated from system usage. However, when the system is not being used to near capacity, the service provider is not deriving any revenue from the unused system capacity and thus would like to be able to attract additional subscribers to make use of the system.

Further complicating the problem of maximizing use of available system capacity is that, even during peak hours of the overall system, certain cells may have surplus capacity and, therefore, are not generating their potential maximum revenue. For example, in FIG. 1 a cell in a city center (C1) may have its peak hour in the middle of the day, while a cell in a suburb (C9) may have its peak hour later in the afternoon. FIGS. 2A and 2B illustrate this problem in another way. FIG. 2A is an example of a macro-cell 21 with one micro-cell 22 indicated within. As illustrated in FIG. 2B while the load approaches maximum capacity for the macro-cell 21, a micro-cell 22 may only be at 60% capacity and thus have an unused surplus capacity even though the macro-cell 21 is congested. Typically, with state of the art cellular systems, service providers are forced to take all cells into account when choosing the time of day for rate reduction. Because the macro-cell 21 is at near capacity, the service provider cannot reduce the rate to increase revenues from the micro-cell 22. Additionally complicating matters is that by instantly lowering the rate the load on the entire system might sharply increase. In other words, these systems fail to take into account that different types of subscribers display different price elasticities and thus fail to maximize revenue for the system providers. These systems also do not address the problem that cheaper rates can only be offered when there is a substantial system wide excess capacity, because the load on the system might sharply increase with any broadcast of the lowering of the rate. Thus, if there is insufficient excess capacity, and a lower rate is offered, congestion will likely result.

Various systems have been contemplated in an attempt to address some of these problems. According to one approach described in U.S. Pat. No. 5,303,297 to Hillis, it has been suggested that system demand be monitored, and based on demand, a charge rate is dynamically calculated and broadcast to subscribers to encourage subscribers to use the system during non-peak times. However, Hillis does not describe how this charge rate is calculated. While the broadcast rate message solution does provide more flexibility than previous systems, it is not a complete solution to maximizing overall use of a system's excess capacity. The system of Hillis fails to consider a particular subscriber's price elasticity and thus the system indiscriminantly discourages some subscribers use of the system. This further results in inefficient use of the system's excess capacity and loss of potential revenue.

It has also been suggested that mobile phone calls could be charged according to where the calls are made, for instance, one price in an office, another on the street, and a third at home, etc. However, in this solution, as with the one described above, overload which might result from a decreased rate can only be alleviated by indiscriminately discouraging certain subscribers service and therefore cannot provide overall optimization of generating maximum revenues from the system.

SUMMARY

The present inventor has recognized because subscriber price elasticity does vary, by optimizing price differentiation between subscribers, the service provider can increase revenue and more effectively regulate system capacity.

It is therefore an object of the present invention to improve use of system capacity regardless of time of day without indiscriminately discouraging subscriber service.

It is another object of the invention to improve overall revenue generated by the cellular system through optimized subscriber price differentiation.

It is a further object to provide increased subscriber satisfaction due to increased flexibility of when subscribers can use the system because it is their choice to place a call at a higher rate or wait until a lower rate is broadcast. The rates being adjusted for the category of user.

The foregoing and other objects are accomplished through implementation of a cellular system, providing a user subscription that is charged according to a Variable Charge Rate (VCR) that is based on the price elasticity of the subscribers. According to one embodiment of the present invention, the service provider monitors the load in each cell and, for each cell, the service provider continuously determines a charge rate that can be tailored to specific subscriber groups according to a number of variables, offering subscribers a VCR that is optimized for the individual cell's capacity and overall system capacity. In one embodiment, subscribers may use mobile stations supporting the Short Message Service (SMS) to provide the subscribers with the broadcast VCR (VCR mobile stations). The system can determine, in real time, optimal VCRs for an individual cell to maximize revenue generated by the cell for any time of the day. The VCRs may be selectively broadcast to VCR-mobile stations to inform subscribers of the current rate of charge for calls. According to an exemplary embodiment of the invention, the VCRs may be tailored to specific categories of subscribers to provide better price differentiation between subscribers based on price elasticity of the subscriber categories.

BRIEF DESCRIPTION OF THE DRAWINGS

The foregoing and other features, objects and advantages of the invention will be better understood by reading the following description in conjunction with the drawings, in which.

DETAILED DESCRIPTION

Figure 1:
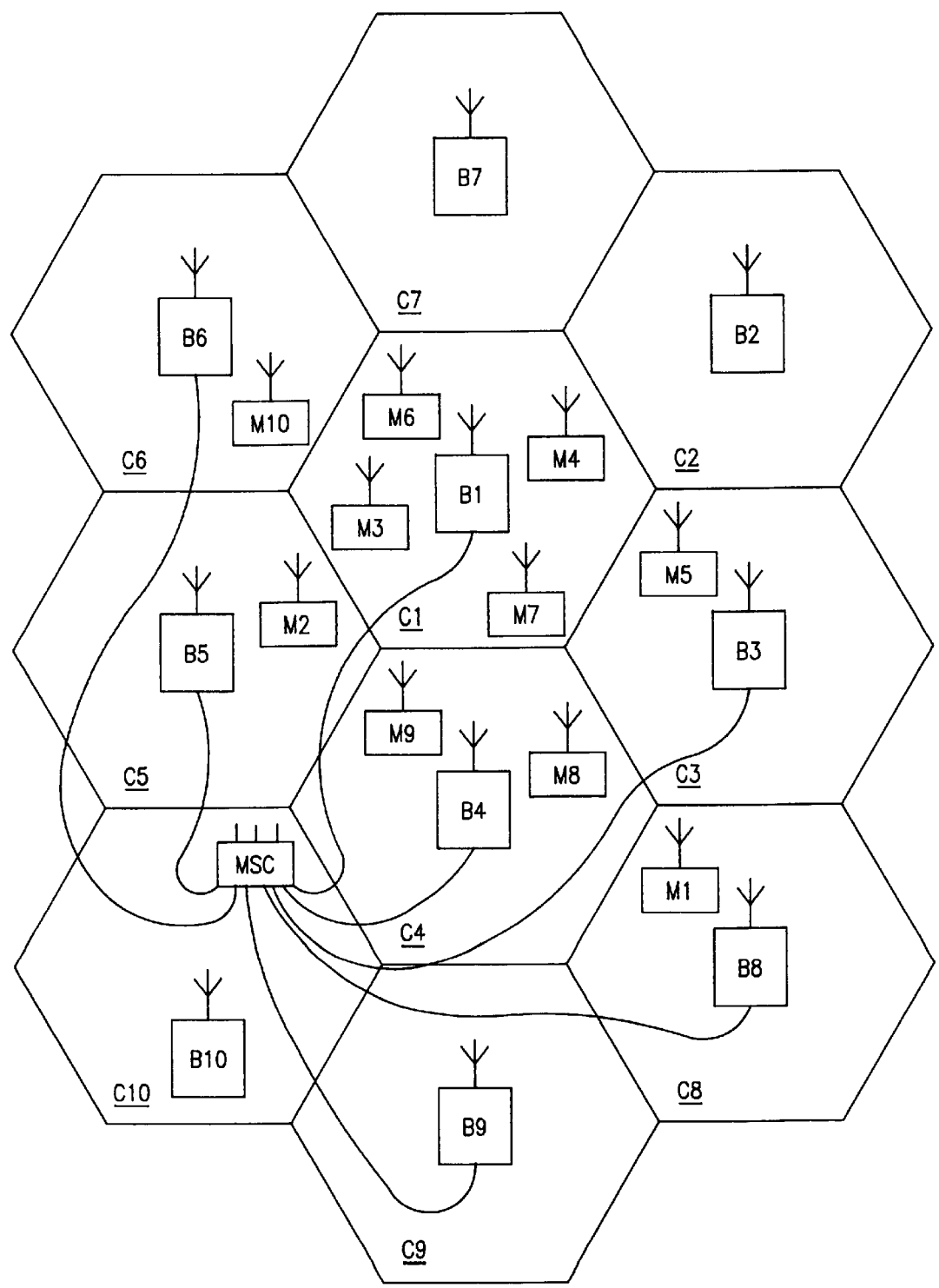
FIG. 1 illustrates an exemplary cellular system arrangement that may be used according to the present invention.
Figure 2A:
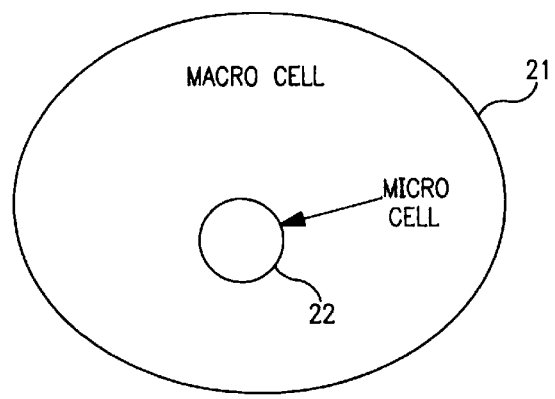
FIG. 2A shows a cellular arrangement for a macro cell and a microcell.
Figure 2B:
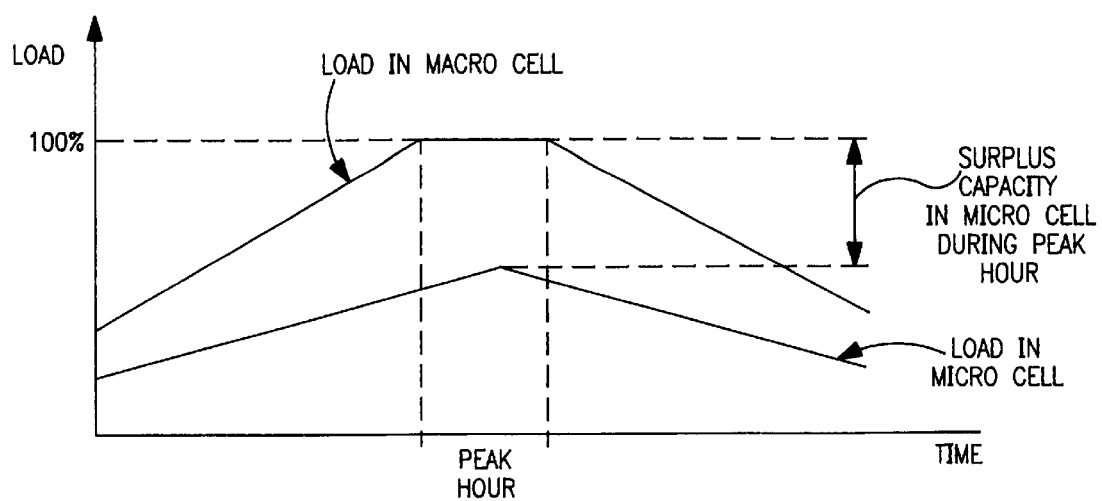
FIG. 2B illustrates the relation between call load in a cell and time in a macro cell and one of its micro cells.

The various features of the invention will now be described with respect to the figures, in which like parts are identified with the same reference characters.

Referring to FIG. 1, a conventional cellular radio communication system which may be used with the present invention is illustrated. FIG. 1 shows an geographic area divided into a plurality of contiguous radio coverage areas or cells labeled C1 through C10. Associated with each of the cells C1 through C10 is a base station designated B1 through B10. Each base station generally includes a transmitter, a receiver and a base station controller, all of which are well known in the art. It is noted that the representation of the cellular radio system according to FIG. 1 is for purposes of illustration only and is not intended as a limitation on the possible implementations of a mobile radio telecommunication system within which the Variable Charge Rate (VCR) system of the present invention may be implemented. For example, the number and size of cells could be varied along with the position of the base station relative to a cell. The VCR according to the present invention may also be used with any of the multiple access communication systems such as GSM, AMPS, D-AMPS, CDMA, or the like.

Also shown in FIG. 1 are a plurality of mobile stations M1 through M10. These mobile stations may roam from one location in the cell to another, from one cell to an adjacent cell, or even from one cellular radio system served by a mobile switching center (MSC) to another such system all while receiving and placing calls both within the cellular system as well as to and from a public switch telecommunications network (PSTN).

Each of the mobile stations M1 through M10 is capable of initiating or receiving a call through one or more of the base stations B1 through B10 in conjunction with the MSC. The MSC is connected by communication links, e.g., cables, to each of the base stations B1 through B10 and to the PSTN (not shown) of a similar fixed network which may include an integrated services digital network (ISDN) facility. According to an embodiment of the present invention, the mobile stations supported by the system can be both VCR-mobile stations and non-VCR-mobile stations. The VCR mobile stations, base stations, and MSC are described in further detail below.

Fixed Charged Rates

Figure 3:
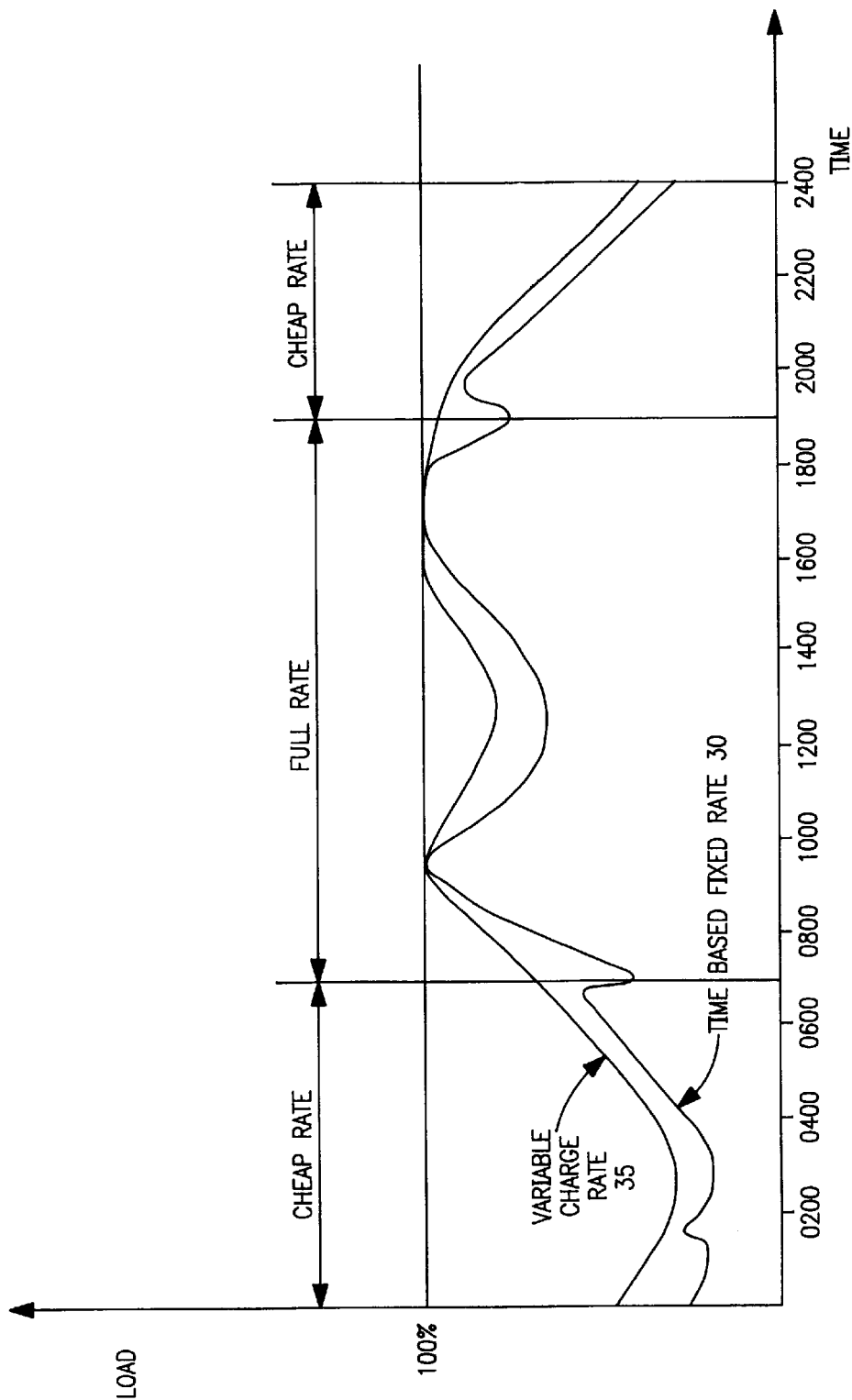
FIG. 3 illustrates the relation between call load in a cell and time.

Turning to FIG. 3 it can be seen that the available capacity of the service area sharply changes with the time of day. An example of the usage levels of a fixed rate system is shown by curve 30. By fixed rate it is meant that the same, unvarying rate is offered to everyone within the system or cell at the same time of day. Normally, demand for the system will be greatest in daylight hours, for example, between the hours of 8:00 to 18:00, the time when most people are awake and active. In addition, the majority of business is also conducted during this period of time. As the business day ends, demand by subscribers to the cellular system continually drops and system capacity increases with demand reaching its lowest in the early morning hours.

Figure 4:
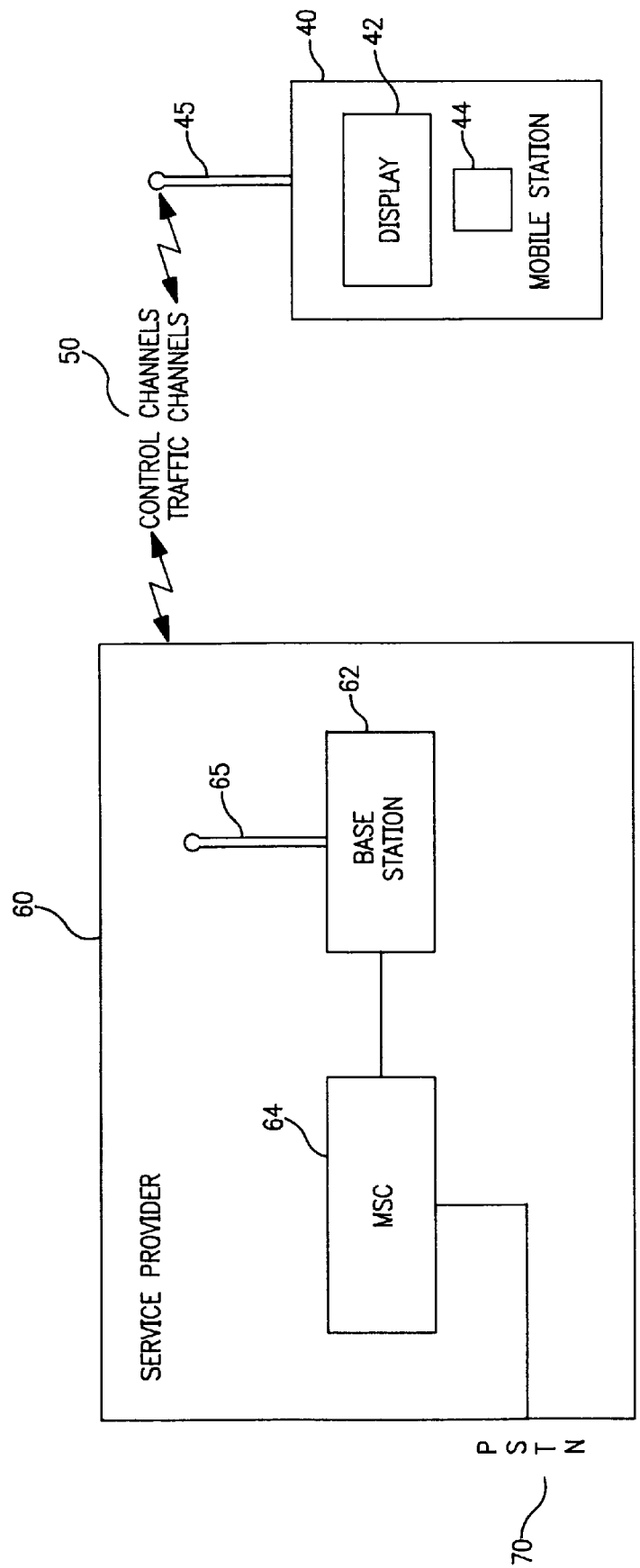
FIG. 4 is an exemplary block diagram of the system according to the present invention.

In a response to the time dependent change in demand, service providers have developed a time based charge rate for the local comlink 50 in FIG. 4. FIG. 3 illustrates this concept with three different time dependent charge rates. During the hours between 7:00 and 19:00 when demand is high, a full rate is charged to subscribers making calls. According to FIG. 3 it can be seen that the demand for the system reaches full capacity or near full capacity in mid-morning and late afternoon with a dip in capacity near mid-day, for example, when people are at lunch. As demand steadily declines beginning around 17:00, the service provider offers a cheaper rate in order to induce additional customer demand for the system. It should be noted that immediately after the cheaper rate is introduced demand for the system increases before peaking and slowly dropping as the evening continues. Conversely in the morning when rates go up around 7:00 demand momentarily sharply drops in a fixed rate system. A second cheaper rate is offered in the early morning hours when user demand is at its lowest.

As only one fixed rate is offered at any particular time within a cell according to prior systems, some subscribers are indiscriminantly discouraged from making calls. For example, suppose a mobile station M7 in cell C1 was used by a student who wanted to make a call in the afternoon. The student may decide to not make the call because the fixed rate charged for a call at this time is too high. However, if cell C1 has unused capacity at this time, the service provider would like to be able to encourage others, such as the student, to make a call thereby using the excess capacity thereby maximizing revenue generated by the cell C1. This is accomplished according to the present invention by determining VCRs for a cell tailored to various subscriber categories. According to the present invention, the service provider can determine that there is an excess capacity in the cell C1 and further determine to offer a lower charge to a particular subscriber category located in the cell C1, such as students, and therefore encourage subscribers such as students to place a call.

By determining various VCRs for each cell over the entire service area, the service provider can maximize the use of the excess system capacity. This can be seen from the VCR curve 35 shown in FIG. 3. By providing VCRs the load on the system is increased over the entire day. In addition, there are fewer sudden drops or spikes in system demand. It should be noted that the VCR would generally be calculated for the local com link 50 shown in FIG. 4. Additional charges may have to be added, for example long distance charges, to determine a total charge rate. Further description of the VCR is provided below.

Variable Charge Rates (VCRs)

According to an exemplary embodiment of the invention, a new type of subscription is introduced. As an alternative to the conventional time of day based charge rates typically used by service providers, according to the present invention, subscribers are offered a VCR. A VCR may also be set for terminating calls in systems in which subscribers also pay for call termination (e.g., in the United States). The service provider monitors the load in each cell and for each cell continuously determines a specific VCR for an individual subscriber or group of subscribers, such that the overall system excess capacity is used and revenue increased. While it is possible to provide an individual VCR for each subscriber, the following description is directed to VCRs for groups of subscribers based on subscriber categories.

In order to provide increased overall demand and revenue generated by the system, a number of factors other than time of day and location are used when determining a specific VCR for a subscriber.

The following list, while not exhaustive, includes some of the factors which may be taken into account by the service provider when determining the VCR:

A. the load of calls charged at a variable rate in the cell $(l_v)$;

B. the load of calls charged at a fixed rate in the cell $(l_f)$;

C. the desired "safety margin", i.e., how close the load may be to congestion (m);

D. the total load in the switch;

E. the number of VCR-mobiles registered in the cell;

F. the average power radiated by the base station;

G. an estimated current demand curve; and

H. the average co-channel disturbance caused by the cell.

Through utilization of these factors a service provider is given greater control in determining an optimum price to charge each user such that overall system usage and revenue can be maximized. Through use of the VCR the provider is no longer limited to time and location but may adjust the various factors such that prices are optimized for the specific system in question. Such optimization may be carried out through use of empirically derived estimate demand curves based on the specific area and subscriber make-up serviced by the system from the factors given above.

Subscriber Demand

According to one embodiment of the present invention an estimate demand curve is used to determine subscriber price elasticity that is in turn used to determine a VCR. The estimate demand curve is a representation of quantity (q) in relation to the price (p). The demand curve can be estimated from the service provider's records of prior system use or through measuring system use over a representative period of time. Use of the estimate demand curves allows the price elasticity of subscribers to be taken into account unlike prior systems. The estimate demand curve may depend on various factors, such as:

G1. the time of day;

G2. the day of week;

G3. the time of year;

G4. the type of district (for instance, business district, residential, industrial, or a hybrid), etc; and G5. the category of subscriber.

Estimation of a Demand Curve

For each VCR charged call, the service provider records time of day, the duration of the call, and the charge rate. The system may continuously record the charge rate and the number of VCR mobiles registered in each cell. When a sufficient amount of data has been accumulated the various demand curves can then be accurately estimated. According to one exemplary embodiment, the day could be divided into a plurality of intervals, and labelled "time of day". For each time of day and each charge rate the service provider determines the duration of all conversations of the subscribers making calls and the duration of exposure to a charge rate of the number of mobile stations registered or in conversation. For any cell, the probability of a mobile station being in conversation at a certain time of day and for a certain charge rate can be estimated. Along the same lines, the system can then estimate demand curves with respect to a plurality of factors, such as day of the week, the time of the year, the type of district, the various subscriber categories, etc. or demand curves may even be split as further described below.

For the purpose of illustrating the general principles according to one exemplary embodiment of the invention, the following simplification has been made: the probability of a subscriber being in conversation does not vary due to say time of day, location, etc.

Assuming that there are r different charge rates, for each charge rate the system sums up (1) the duration of conversations, and (2) the duration of offer, i.e., the duration that mobile stations have been offered that charge rate (either registered in cells or in conversation). The probability p of a mobile station being in conversation at a given charge rate then can be estimated as:

$$\hat{p} = \frac{\sum \text{Duration of Conversation}}{\sum \text{Duration of Offer}} \qquad \text{EQUATION (1)}$$

Numerical Example

Consider a system with 50 subscribers, one cell, and two charge rates: $1.5 and $3.00. The system is run for 10 hours, varying the charge rate. During this time the subscribers are offered calls at $1.50 and $3.00 for a duration of 6 hours and 4 hours respectively. If it turns out that the subscribers as a whole have been in conversation for 24 hours when calls were cheap and for 6 hours when they were more expensive, by inserting in Equation (1) the probability of a mobile station being in conversation during the cheap period can be estimated as being $p_{1.50}$=24 h/(50×6 h)=8%. The probability for both rates is shown in Table 1 below.

TABLE 1

| Charge Rate | Duration of Offer | Duration of Calls | $\hat{p}$ |
|---|---|---|---|
| $1.50. | 300 hours | 24 hours | 8% |
| $3.00. | 200 hours | 6 hours | 3% |

Sufficient Data

A sufficient amount of data is obtained when the estimations of $p_1, \ldots, p_r$ differ significantly. This can be determined as described below.

The example is simplified by reducing the number of charge rates to two. In addition, only the duration of the calls is taken into account, and the number of calls is disregarded.

If there are n calls at $rate_1$, the duration of each call could be perceived as the outcome of independent exponentially distributed random variables $X_1, \ldots, X_n$, where the expected duration is $\beta_1$. Likewise at $rate_2$: the expected duration of $Y_1, \ldots, Y_m$, is $\beta_2$. Assuming $\beta_1 > \beta_2$ the test variable is:

$$Z = \frac{\sum_{i=1}^{n} X_i / n}{\sum_{i=1}^{m} Y_i / m} \qquad \text{EQUATION (2)}$$

The test variable is used to verify that the change of call duration is caused by the change of the charge rate and not just as an accidental coincidence. The critical area of a test at significant level $\alpha$ is represented according to an "F" distribution as:

$z > F(2n, 2m)_{1-\alpha}$ where z is the observed value of the test variable Z. Therefore the duration of calls is summed up until z is in the critical area.

NUMERICAL EXAMPLE

Assume, for example, that the duration of 50 random calls at $1.50 is $\Sigma x_i$=9000s; and at $3.00 $\Sigma y_i$=6400. The observed value of the test variable, according to equation 2, would be:

$$Z = \frac{9000/50}{6400/50} = 1.41$$

The critical area for a test at a 5% level is $z > F(100,100)_{0.95}$=1.39. Therefore, the hypothesis that the expected duration is the same for both charge rates can be rejected and instead it is concluded that $\beta_1$=180s and $\beta_2$=128s.

One of skill in the art would appreciate that the above method can be generalized to include the case of a greater plurality of charge rates.

Splitting of Demand Curves

If for one reason or another it is suspected that the behavior of a subscriber category differs due to a factor, such as time of day, week, district, etc, then the general demand curve may be split into new (estimated) demand curves for the identified factor, provided that the demand curves differ significantly. Two demand curves differ significantly if and only if the probability of conversation of at least one charge rate differs significantly. For example, if a category of subscribers in New York city were professionals, a number of demand curves could be derived based on the factor of time of day. However, additional factors might govern professionals' behavior within NY. If a service provider suspected that professionals on Wall Street made a large number of calls of short duration, by isolating these calls from the rest of professionals' calls in New York, additional demand curves for Wall Street could be split from the rest of New York's professionals.

Price Elasticity

Subscriber price elasticity $\epsilon$ is the derivative of a subscriber estimated demand curve. It is defined as:

$$\epsilon = \frac{\Delta q / q}{\Delta p / p} \qquad \text{EQUATION (3)}$$

where q is "quantity", i.e. load, and here p is "price", i.e., VCR. By rearranging the following equation is obtained:

$$\Delta p = \frac{p}{q} \Delta \frac{q}{\epsilon} \qquad \text{EQUATION (4)}$$

In intervals where price elasticity $\epsilon$ can be considered constant the following relationship exists:

$$q = A p^{\epsilon} \qquad \text{EQUATION (5)}$$

where A is a positive constant. If the estimate demand curve is discrete, i.e. quantity q is only known for finite number of values of p, then $\epsilon$ between $p_i$ and $p_{i+1}$ can be calculated as:

$$\epsilon = \frac{\log(q_{i+1}) - \log(q_i)}{\log(p_{i+1}) - \log(p_i)} \qquad \text{EQUATION (6)}$$

Single Category of VCR-Mobiles

Congestion

The following is an example of how the VCR may be calculated. According to this example, a simplified case is considered where there are only two categories of mobile stations in a cell: fixed charge rate (FCR)-mobile stations and VCR-mobile stations. The load caused by the two categories is $l_f$ (load caused by FCR-mobile stations) and $l_v$ (load caused by VCR-mobile stations). When $l_f + l_v = 1$ the system is congested or, in other words, at full capacity. According to the invention, only the VCR mobile stations can be influenced, therefore $q = l_v$. The change that is desired is $\Delta q = 1 - m - l_f - l_v$. Dynamically determining the VCR the $VCR_{new} = VCR_{old} + \Delta VCR$. By insertion in Equation 4, a new VCR is determined:

$$VCR_{new} = VCR_{old} * \left(1 + \frac{(1 - m - l_v - l_f)}{l_v * \epsilon}\right) \qquad \text{EQUATION (7)}$$

Surplus Capacity

As described above, when there is surplus capacity in a cell then the charge rate should be set so that the revenue is maximized. Based on economics theory one skilled in the art would appreciate that this is obtained when $|\epsilon| = 1$. When the VCR calculated according to Equation 7 reaches a level so that $|\epsilon(VCR)| = 1$ the VCR will no longer be reduced (in a simplified case where the demand curve is constant over time).

Multiple Categories of VCR-Mobiles

As example of multiple categories one category could be "normal private citizens", and another could be "students" (here considered more price sensitive). Both categories are attributed a specific estimate demand curve.

In the case of congestion the lowest charge rate would normally be increased (and broadcasted to the corresponding subscriber category). This charge rate can be calculated according to Equation (7), where the load of the "affluent" subscriber category may be lumped together with the fixed rate mobiles $l_f$. If the two charge rates become identical, then the two categories of VCR-mobiles could be combined. The common charge rate would then be calculated according to Equation (7) and broadcasted to both categories. In contrast, when there is excess capacity the charge rates would be lowered according to subscriber category and broadcast to the corresponding subscribers.

System Applications

The VCR may be determined in real time by the service provider. This can be implemented in a number of ways. For example, the determination can be made at the MSC or other central location within the service provider by any calculation means, such as a computer or processor, for instance. In an alternative embodiment, calculation of the charge rate could be decentralized, for example, by allowing the MSC to inform the base stations of a minimum acceptable charge rate, but otherwise let the base stations calculate the VCR and then broadcast it. According to this exemplary embodiment the VCRs would be calculated by a computer or processor located at each base station.

Another embodiment of the invention will now be discussed in conjunction with FIG. 4. Once a VCR has been determined (either centrally or at the base station), the VCR is then broadcast from a base station 62 from its antenna 65 over communications channels 50 where it is received by the antennas 45 of any registered mobile stations 40. The service provider 60 would have at least one mobile switching center 64 linked to a PSTN 70, as is conventional. According to the present invention the mobile stations 40 may refer to any information or communication device that may be used to communicate information, for example, a fixed wire telephone, a cellular phone, facsimile receiver, modem, computer or other communication means. The VCR could then be displayed on a display 42, for example, at the mobile unit 40 for the subscriber.

The VCR could be transmitted to the mobile stations in many different ways. According to one embodiment the VCR could be broadcast to the mobiles stations 40 using the user group short message service (SMS) as provided in the (D)-AMPS system. According to this embodiment there could be a special user group for each subscriber category associated with the VCR mobile stations 40, so that other mobile stations are not inadvertently informed. It follows that all system users do not have to belong to a VCR subscriber category. Of course, as the number of VCR mobile stations increases, the greater the overall demand control and revenue generated becomes.

Alternatively, according to another embodiment, an existing message (such as the system identity message described in EIA standard IS-136.1 6.4.1.1.1.5) on the forward control channel (CC) could have a new information element added indicating current VCRs in a cell. Another embodiment would be to send the VCRs individually to each mobile station using point-to-point short message services (SMS). Alternatively, a new message containing an information element indicating current VCRs in a cell could be added, or, an existing information element in an existing message, e.g., "display" in registration accept could be used to convey the VCR as provided in IS-136 6.4.3.14. According to another exemplary embodiment of the invention the VCRs broadcast could be repeated either intermittently or at regular predefined intervals. However, in all cases the VCR should be broadcast whenever it changes.

When a mobile station 40 not in conversation is registered in one cell and then moves to a neighboring cell, the mobile station will register in the new cell, via channel re-allocation, as known by those skilled in the art. If the new cell has a different VCR for the subscriber the mobile station 40 should be informed as soon as possible. The simplest method of informing the subscriber of the new rate would be to use the information element "display" in the registration accept, of course any of the alternative methods described above could also be used. When the mobile station 40 performs its initial registration the same information element could be used; however, several of the methods described above could also be used.

If during a conversation a mobile station 40 is handed off to another cell a service provider 60 could then send a message to the mobile station 40 informing that the VCR will be changed after a predefined period, and what the future VCR will be. The decision to change the VCR could depend on a plurality of factors, such as the difference between the current VCR and the potential future VCR, the subscriber category, the individual subscriber, the load situation, etc. Similarly, the mobile station could also alert the subscriber if the VCR changes during a conversation allowing the subscriber to determine if they wish to continue the call at the new rate. The mobile station could provide the alert either visually or audibly.

According to another embodiment the mobile stations 40 could continuously read the relevant broadcast message and display the current VCR of the cell for the associated subscriber. Additionally the mobile station 40 could alert the subscriber when the VCR drops below a predetermined threshold entered by the user through a user interface in the mobile station (e.g., key pad 44). The alert could be provided either visually or audibly through an additional circuit or processor included at the mobile station which would determine when a VCR has dropped below the predetermined threshold. Alternatively, the service provider could determine when the VCR is below the threshold and alert the mobile stations. According to this embodiment the subscriber could inform the service provider of his threshold (e.g., by submitting an SMS message).

The display 42 at the mobile unit 40 could be of any type able to display human readable characters, (e.g., LCD, LED, etc.) Alternatively, the present invention could be practiced on mobile units 40 without displays 42 by allowing a subscriber to receive a broadcast audio message conveying the current VCR to the mobile station 40.

In situations where a device, such as a telefax or computer, needs to react to a VCR the VCR can be broadcasted in machine-readable form. For example, the charge rate could be converted to a string of ASCII characters that are formatted according to a standard so that the VCR may be understood by machine as well as humans. Alternatively, the VCR could be coded as a binary string. In cases where the mobile station has a display the mobile station could translate the binary string to ASCII characters and then display it.

In yet another embodiment according to the present invention, the initiating subscriber could actively enter a number to which the user desires to be connected via keypad 44. Accordingly, the calling mobile station 40 transfers the desired phone number being called via comlink 50 to the service provider 60 through the base station 62. The service provider 60 could then determine a VCR, add any additional charges necessary, for example for long distance, and transfer the total charge rate information back to the mobile station 40 via the comlink 50. The total charge rate information is indicated to the mobile station via the display 42 or other means as described above. The subscriber could then be given the option to actually place the call. Any number of means could also be used to alert the user to the arrival of such a message, such as a flashing light, highlighted display, tone, etc.

According to the present invention, many further enhancements and refinements of the charge function can also be introduced. As described above, a plurality of subscription categories designed for specific customers possessing unusual price elasticity (for instance such as students, businessmen, according to household income, etc.) could be formed. Charge rate policies could then be tailored for each category and broadcast accordingly. Estimate demand curves would then be determined for each identified category. As described above in the example for splitting of demand curves, the categories may depend on the area, and sub-area where the service provider is located as described in the Wall Street demand curve. Alternatively, in certain areas there may be a concentration of one or more existing subscriber categories, (e.g., students and teachers on a university campus). In this situation the service provider could merely use the existing estimated demand curves for these groups instead of determining new ones.

According to the present invention, with expedient setting of parameters the system will virtually never become congested simply because as traffic increases, the price of a call will go up until a given number of subscribers are priced out of making a call. In order to know where to increase system capacity, for example by splitting cells or adding microcells, the service provider 60 may estimate and record the potential load in the cells, in other words, what the load would have been if the VCR had to be set to a certain value.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. A communications system servicing a plurality of subscribers comprising:
   at least one base station in a cell for communicating with a plurality of mobile stations;
   a mobile station capable of communicating to and receiving calls from the at least one base station, including a display for displaying a current charge rate received from the at least one base station, wherein the current charge rate is based on subscriber price elasticity, wherein said subscriber price elasticity is based on at least subscriber demand curves, said subscriber demand curves being based on at least categories of subscribers.

2. The system of claim 1 wherein the current charge rate is determined based upon a request received from the mobile station and then the current charge rate is transmitted to the mobile station.

3. The system of claim 1 wherein the current charge rate is transmitted to the mobile station from the base station.

4. The system of claim 1 wherein the subscribers are divided into subscribers categories based on price elasticity.

5. The system according to claim 1 wherein the current charge rate is additionally based on a call load within the system.

6. The system according to claim 5 further comprising:
   a processor for determining the current charge rate.

7. The system of claim 1 wherein the current charge rate is based on a current call load within a cell where the mobile station is located.

8. The system of claim 7 wherein the processor determines the current charge rate based on at least one of the factors of: the number of calls in a cell charged at a variable charge rate, the number of calls in a cell charged at a fixed charge rate, and the total number of calls handled by the system.

9. The system of claim 8 wherein the current charge rate includes a safety margin of how close to congestion the current call load may be.

10. The system of claim 1 wherein the subscriber price elasticity is determined from demand curves.

11. The system of claim 10 wherein the demand curves are communication demand curves.

12. The system of claim 10 wherein the demand curve is determined based on at least one of the factors of time of day, day of week, time of year, type of district, and category of subscribers.

13. The system of claim 10 wherein the demand curve is determined based on the factors of time of day, day of week, time of year, type of district, and category of subscribers.

14. A method for optimizing use of the capacity of a radio communications system including a plurality of cells and servicing a plurality of subscribers, each cell including at least one base station capable of communicating with a plurality of mobile stations, and means for continuously monitoring the call load of each cell, the method comprising the steps of:
   monitoring the current call load of each cell;
   determining a plurality of charge rates based on price elasticities of the subscribers, wherein said subscriber price elasticities are based on at least subscriber demand curves, said subscriber demand curves being based on at least categories of subscribers.

15. The method of claim 14, wherein the current charge rate is based on the current call load within a cell where the mobile station is located.

16. A method according to claim 14 wherein the current charge rate is additionally based on the current call load in a system.

17. The method of claim 15 further comprising the step of broadcasting the plurality of charge rates to a plurality of mobile stations in a cell, wherein each charge rate is broadcast to a subset of the plurality of subscribers wherein the subset is based on a subscriber category.

18. The method of claim 14 wherein price elasticity is determined from subscriber demand curves.

19. The method of claim 18 wherein the demand curves are based on a history of charge rates in every cell, a history of the number of mobiles registered in every cell, and a history based on categories of subscribers using the system.

20. A method according to claim 14 wherein the current charge rate is additionally based on a current call load within a cell.

21. The method of claim 16 further comprising the step of broadcasting the plurality of charge rates to a plurality of mobile stations in a cell, wherein each charge rate is broadcast to a subset of the plurality of subscribers wherein the subset is based on a subscriber category.

22. A system for optimizing use of the capacity of a radio communications system having a plurality of cells serving a plurality of subscribers, the system comprising:

means for determining a charge rate based on a price elasticity of subscribers, wherein said subscriber price elasticity is based on at least subscriber demand curves, said subscriber demand curves being based on at least categories of subscribers; and means for transmitting the charge rate to the plurality of subscribers.

23. The system of claim 22 wherein the charge rate determining means additionally determines the charge rate based on a current call load in the system.

24. The system according to claim 22 wherein the charge rate determining means additionally determines the charge rate based on a current call load in a cell.

25. The system of claim 22, further comprising:

a mobile station including means for communicating to a user a current charge rate received from the transmitting means.

26. The system of claim 22 wherein the current charge rate is based on the current call load within a cell where the mobile station is located.

27. The system according to claim 22 wherein price elasticity is determined from demand curves.

28. The system of claim 24 wherein the demand curves are based on at least one of the factors of time of day, day of week, time of year, type of district, and category of subscriber.

29. The system of claim 28, wherein the demand curves may be split based on one of said factors if the demand curves differ significantly.

30. The system of claim 28, wherein the charge rate is determined for a category corresponding to a subset of the plurality of subscribers and only transmitted to the subset of subscribers.

* * * * *